United States Patent [19]

Riordan

[11] Patent Number: 5,202,944
[45] Date of Patent: Apr. 13, 1993

[54] COMMUNICATION AND POWER CABLE

[75] Inventor: Mathew B. Riordan, Garden Grove, Calif.

[73] Assignee: Westech Geophysical, Inc., Ventura, Calif.

[21] Appl. No.: 708,977

[22] Filed: May 31, 1991

Related U.S. Application Data

[62] Division of Ser. No. 540,573, Jun. 15, 1990, Pat. No. 5,140,319.

[51] Int. Cl.⁵ .............................................. G02B 6/44
[52] U.S. Cl. ..................................... 385/101; 385/107
[58] Field of Search ............... 385/101, 107, 108, 113

[56] References Cited

U.S. PATENT DOCUMENTS

| Re. 32,293 | 11/1986 | Dey et al. | 385/101 |
|---|---|---|---|
| 2,632,801 | 3/1953 | Donaldson | 178/6.6 |
| 2,852,600 | 9/1958 | Jenkins, Jr. | 178/6.8 |
| 2,912,495 | 11/1959 | Moon et al. | 178/6.8 |
| 3,199,613 | 8/1965 | Malott et al. | 175/5 |
| 3,320,359 | 5/1967 | Ikegami | 178/6.8 |
| 3,825,320 | 7/1974 | Redfern | 350/96 B |
| 3,885,091 | 5/1975 | Fish et al. | 178/6 |
| 3,943,410 | 3/1976 | Kalberer, Jr. et al. | 317/31 |
| 4,162,400 | 7/1979 | Pitts, Jr. | 205/256 |
| 4,229,762 | 10/1980 | Healy | 358/100 |
| 4,246,604 | 1/1981 | Hundertmark et al. | 358/100 |
| 4,278,835 | 7/1981 | Jackson | 385/101 |
| 4,371,234 | 2/1983 | Parfree et al. | 385/101 |
| 4,375,313 | 3/1983 | Anderson et al. | 350/96.23 |
| 4,389,645 | 6/1983 | Wharton | 340/854 |
| 4,460,419 | 7/1984 | Parfree et al. | 385/101 |
| 4,469,399 | 9/1984 | Cowen et al. | 350/96.20 |
| 4,598,290 | 7/1986 | Collins et al. | 340/850 |
| 4,632,506 | 12/1986 | Taylor | 385/101 |
| 4,687,293 | 8/1987 | Randazzo | 350/96.23 |
| 4,696,903 | 9/1987 | Owen | 436/28 |
| 4,756,595 | 7/1988 | Braun et al. | 350/96.21 |
| 4,832,443 | 5/1989 | Cameron et al. | 385/101 |
| 4,938,060 | 7/1990 | Sizer et al. | 73/151 |
| 4,993,805 | 2/1991 | Abe et al. | 385/101 |

FOREIGN PATENT DOCUMENTS

| 0178870 | 10/1985 | European Pat. Off. . |
|---|---|---|
| 0352148 | 5/1989 | European Pat. Off. . |
| 2104752A | 7/1982 | United Kingdom . |
| 2173034A | 2/1986 | United Kingdom . |

Primary Examiner—John D. Lee
Assistant Examiner—John Ngo
Attorney, Agent, or Firm—Fulwider, Patton, Lee & Utecht

[57] ABSTRACT

A cable containing an optical fiber for conducting communication signals and electrical conductors for conducting power. The optical fiber is centrally located. An inner layer includes electrical conductors and an outer layer includes electrical conductors interspaced with strength members. The interspaced strength members are in electrical contact with the electrical conductors and lower the loop resistance so that a power source may be used at one end of the cable and the equipment to be powered at the other without requiring an excessively large voltage at the power source. In one embodiment, the strength members are formed of steel and are interspaced such that there is one strength member per two electrical conductors. The cable is enclosed in a smooth and continuous stainless steel outer sheath.

10 Claims, 4 Drawing Sheets

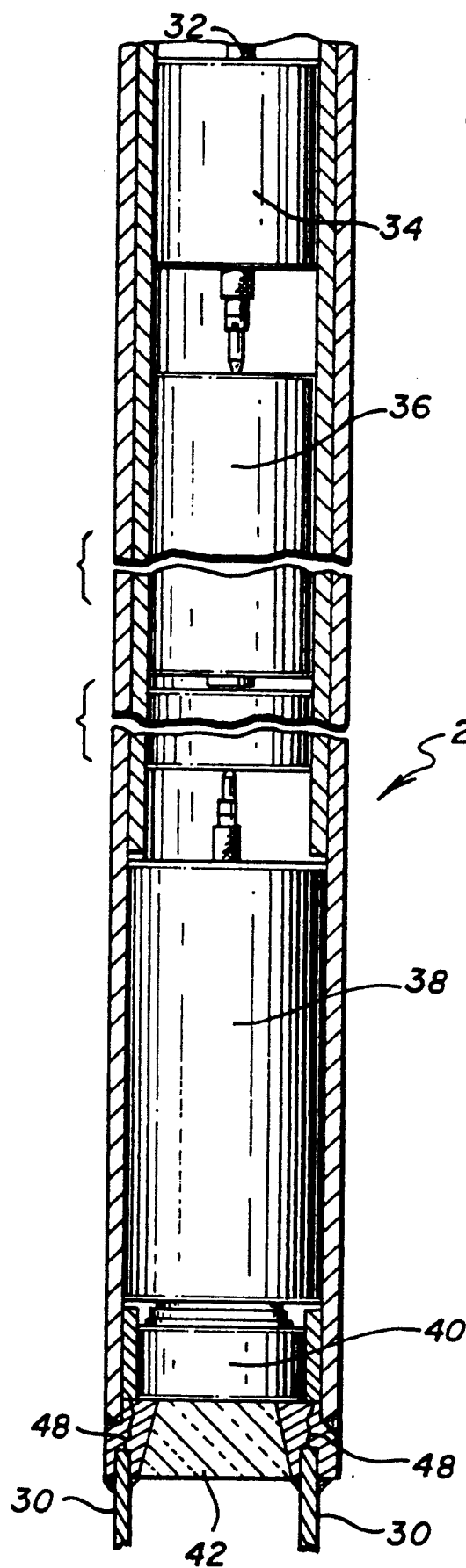
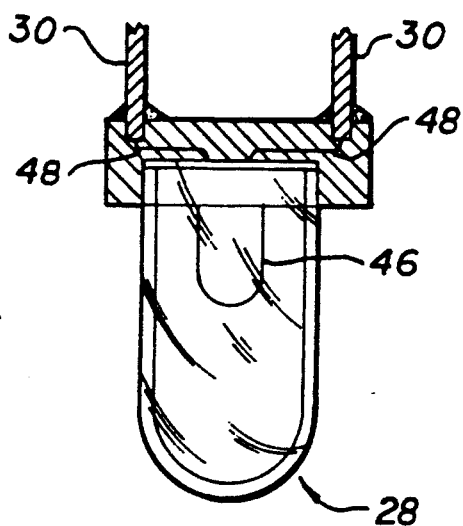
FIG. 3
FIG. 4

COMMUNICATION AND POWER CABLE

This is a divisional of copending application Ser. No. 07/540,573 filed on Jun. 15, 1990 (now U.S. Pat. No. 5,140,319).

BACKGROUND

The invention is related generally to the remote viewing of well bores and other limited access areas, and more particularly, to an apparatus having a camera for remotely viewing the condition of such limited access areas.

There has long been a need in the field of well boring to visually examine the bore hole to examine geological formations or for other reasons. Where those well bores have casings and fittings, there is a continuing need to inspect the casings and fittings for corrosion and other conditions. By means of visual inspection, the locations of leaks and points of infiltration can be more easily identified.

One existing method of accomplishing this is to insert an instrument probe containing a camera, such as a closed circuit television camera, in the bore hole and move it through the area to be inspected. Typically, a compact, rugged instrument containing the camera and a light source is provided as an instrument probe. A cable is attached between the instrument probe and the surface station to communicate camera signals to the surface from the instrument probe. In one technique, the communication link comprises optical fibers. Where the bore is vertical, gravity can be used to pull the instrument probe through the bore hole. The support cable contains strength members which preserve the integrity of the cable as it and the instrument probe are being pulled from the bore hole.

Optical fibers offer certain advantages in communication systems. They are relatively immune to electromagnetic interference, they have relatively low cable weight, they have a large bandwidth, high frequency video signals can be transmitted over long lengths of cable with minimum attenuation and they have lower cost. Thus they are desirable in a remote logging instrument probe such as that used to view bore holes. However, optical fibers are sensitive to point stresses and bending. The fiber may impart significant attenuation to its conducted signal when bent. The cable system of a well logging instrument is repeatably pulled around at least one sheave and wound on and off a winch drum as it is lowered into and lifted out of bore holes. The cable must withstand repeated bending and tensions of thousands of pounds. Stretching the cable can stretch the optical fibers thereby increasing their stress and aggravating their attenuation. High pressures and high temperatures in the well holes may assist moisture in invading the cable and the optical fibers. Moisture invading the optical fiber through micro-cracks can increase its attenuation and reduce its strength. Thus, the cable connecting the instrument probe with the remote controller must protect the optical fibers as well as be strong enough to withstand repeated bending about sheaves and a winch drum, withstand stretching forces and the high temperatures and pressures in the bore hole.

A logging instrument probe for well holes must be rugged to withstand the sometimes harsh conditions encountered in typical operation. For example, hydrostatic well pressures in excess of $4.2 \times 10^6$ kilograms per square meter (6,000 pounds per square inch) and ambient wall temperatures of up to and above 190° C. (375° F.) are not uncommon. The point where the support cable enters the instrument probe must have effective seals to deflect such high pressure/temperature fluids from entering. The main purpose of such seals is to protect the camera, the optical fibers and the electrical connections from the fluids present in the bore hole. Such seals have been difficult to manufacture on a repeatable basis and make the instrument probe very expensive as well as unreliable. Thus, it would be desirable to provide an effective seal arrangement which can be manufactured on a repeatable basis and which uses standard parts readily available thereby lowering the cost of the seal.

Another common condition in bore holes is turbidity in the form of gases, mud, oil, and other fluids under high pressure. In prior techniques, high intensity lighting such as that provided by quartz lamps or halogen lamps, is provided to give bright light in the visible range for use with conventional television cameras. Depending upon the amount of turbidity, higher intensity light from the lamps may be required to provide clear images.

In order to provide power for such lamps and for the camera and other equipment, well bore inspection instruments carry a self-contained power supply, typically battery packs. In addition to adding weight and bulk to the instrument probe, these battery packs have a limited life which is directly dependent upon the intensity of the lights. As an example, many battery packs of the size which can fit in a bore hole logging instrument probe can provide power for only 3 to 3½ hours when used with halogen lamps. Upon dissipation of the stored energy, the battery packs must be removed and replaced with charged batteries or a charging process must occur which may take many hours. This usually requires that the instrument probe be removed from the well hole, dis-assembled and re-assembled. This can be a time consuming process which subjects the support cable of the instrument probe to the added stresses of being pulled over the sheave and wound on the drum an additional time.

To the inventor's knowledge, remotely locating a power source has up until this time not been practical in an application where a small diameter optical fiber is employed in the support cable having the extremely long lengths required for deep well holes. The power source has been included in the instrument probe itself. This co-location of power source with instrument probe was caused by the long lengths of cable required for use in deep well bores. In prior cables, the steel strength members of the cable were used as part of the electrically conductive path. Typically, the strength members are made of steel which has a relatively high specific resistance, and therefore a low resistive loop circuit was not available to carry the required current at an acceptable working voltage. The diameter of the strength members was increased to result in less resistance; however, even with this technique, the loop resistance was relatively high and the increased size of the strength members resulted in a large cable with the associated disadvantages of high weight and bulk. Additionally, such strength members were used to form the outer surface of the cable, thus making it rough and more difficult to handle.

Hence, it would be desirable to provide an improved power arrangement so that the power source for the well logging instrument probe could be remotely located from the probe, such as at the surface, yet impracticably large voltages would not be required in order to get the required power over the typically long distances between the surface and the probe. Additionally, it would be desirable to provide a smaller support cable and a support cable having a smooth outer surface to facilitate handling, yet one having the required strength. Additionally, those concerned with instrument probes for use in viewing bore holes and casing have recognized the need for an improved sealing system to keep fluids from entering the probe which can be manufactured on repeatable and economical bases. The invention fulfills those needs.

SUMMARY OF THE INVENTION

Briefly and in general terms, the present invention provides a video logging inspection system with an instrument probe having improved sealing and a remotely located power source. In one embodiment, the instrument probe comprises a closed circuit television camera and an optical fiber or fibers are used to conduct the camera signals to the surface for remote viewing. A light source is placed forward of the camera for illuminating the walls of the bore hole, casing and fittings. Three mounting bars are used to firmly extend the light source forward of the camera lens and protect the electrical power cables powering the lights. The length of the bars is selected in dependence upon the inner diameter of the bore hole or casing.

The power source for both the camera and the light source is located at the surface. Power is conducted to the components in the instrument probe through a multi-conductor support cable having the optical fiber, the electrical conductors and the strength members all enclosed in a smooth outer sheath which in one embodiment is made of stainless steel. The outside sheath is thin enough so that it may be routinely pulled around sheaves and rolled on the winch drum for transport yet is strong enough to protect the inner conductors and strength members. The support cable has the optical fiber located in the center and a buffer material surrounding the optical fiber. Next is a layer of inner power conductors which are surrounded by a layer of insulation. Next is a layer of strength members alternating with outer electrical conductors. Surrounding this layer is insulation and surrounding this and all layers is the outer sheath of the cable.

In order to prevent fluids from entering the instrument probe along the support cable entry point, a multiple seal arrangement has been provided. In one embodiment, the sealing arrangement comprises three seals. The first seal comprises flexible material such as multiple "O-rings" compressed around the support cable at the end of the instrument probe where the support cable enters. The second seal is formed in conjunction with the breakaway connection. A strength tube is placed over a section of the cable, the outer sheath removed thereafter and the strength members and outer electrical conductors are bent back over the tube. A fluid resistant, adhesive caulking material such as epoxy is applied to the bent-back strength members and outer conductor strands. A bulkhead tube, which is rigidly connected to the bulkhead, is then mounted over the bent-back strength members and conductors. Enough epoxy is used to fill the gaps between the strands and to also fill the bulkhead tube around the cable to the bulkhead. The epoxy not only holds the strands in place but also provides a fluid seal. The bulkhead tube makes electrical contact with the bent back electrical conductors to establish an electrical path.

The third seal is formed at the bulkhead of the instrument probe. A threaded compression coupler is screwed at one end into the bulkhead. The threads used for the bulkhead connection are in one embodiment NPT pipe threads, thus providing a fluid seal. The remainder of the support cable (less the already bent-back members) proceeds through the bulkhead tube and through the bulkhead. A metal sheath also containing a fluid resistant, adhesive caulking material is mounted over this portion of the support cable and enters the compression coupler at its other threaded end. A compression fitting slides over the metal sheath and a threaded compression nut is screwed onto the second threaded end of the compression connector to compress the compression fitting onto the metal sheath thus forming a fluid seal at the bulkhead. The epoxy forms an internal fluid seal at the bulkhead while the compression fitting forms an external seal.

Because the power source is located at the surface, no battery packs are needed in the instrument probe and it can be used for much greater time periods for observation of the conditions of the bore hole, the casing and the fittings. A support cable provides not only the optical fiber support and strength members but also the power transmission means necessary to operate the camera and lights and other equipment in the instrument probe. The triple seal of the cable in the instrument probe provided by the invention assures protection of the instrument probe equipment and is easily and relatively inexpensively provided.

These and other objects and advantages of the invention will become apparent from the following more detailed description when taken in conjunction with the accompanying drawings of illustrative embodiments.

BRIEF DESCRIPTION OF THE DRAWINGS

FIG. 3 is a partial cross-sectional side view of part of the camera section of the probe showing the camera, cabling, power distribution section, fiber optic transmitter section, lens and mounting points of the support legs used to hold the light section in front of the lens of the camera;

FIG. 4 is a partial cross-sectional view of the light section of the instrument probe showing a halogen lamp and the legs and mountings;

DESCRIPTION OF THE PREFERRED EMBODIMENTS

Figure 1:
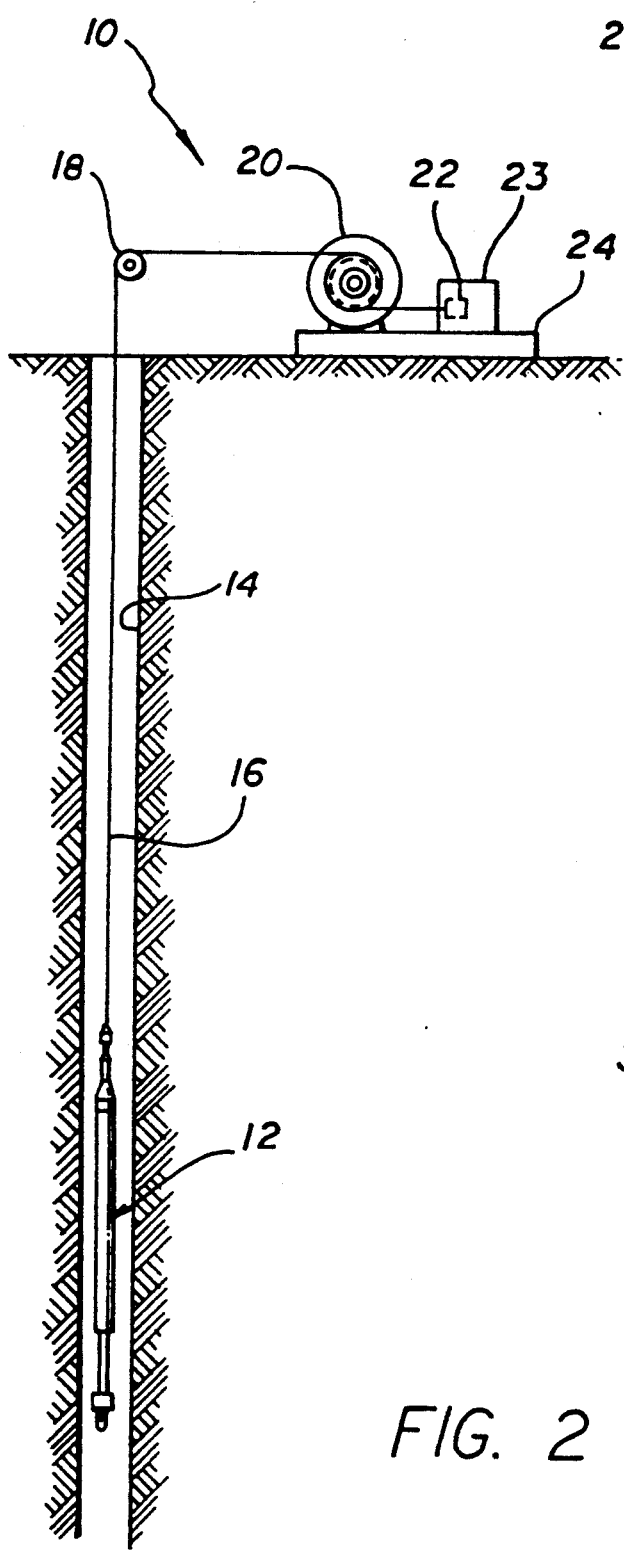
FIG. 1 is an overall block diagram of a well logging system according to the present invention.

In the following description, like reference numerals will be used to refer to like or corresponding elements in the different figures of the drawings. Referring now to the drawings with more particularity, in FIG. 1 there is shown a well logging system 10 comprising a well bore instrument probe 12 which has been lowered into a well bore 14, a support cable 16, a sheave 18, a rotatable winch drum 20, a surface controller 22, a controller enclosure 23 and a transportable platform 24 which in this case is a skid unit. One end of the support cable 16 is wound on the drum 20 which supports the cable 16 for raising and lowering it into the bore 14 as the drum is rotated. The surface controller 22 controls the operation of the winch and the probe 12 and receives and processes information provided by the probe 12. The control enclosure 23 may include a recorder, such as a video tape recorder, for recording the information provided by the probe 12.

Figure 2:
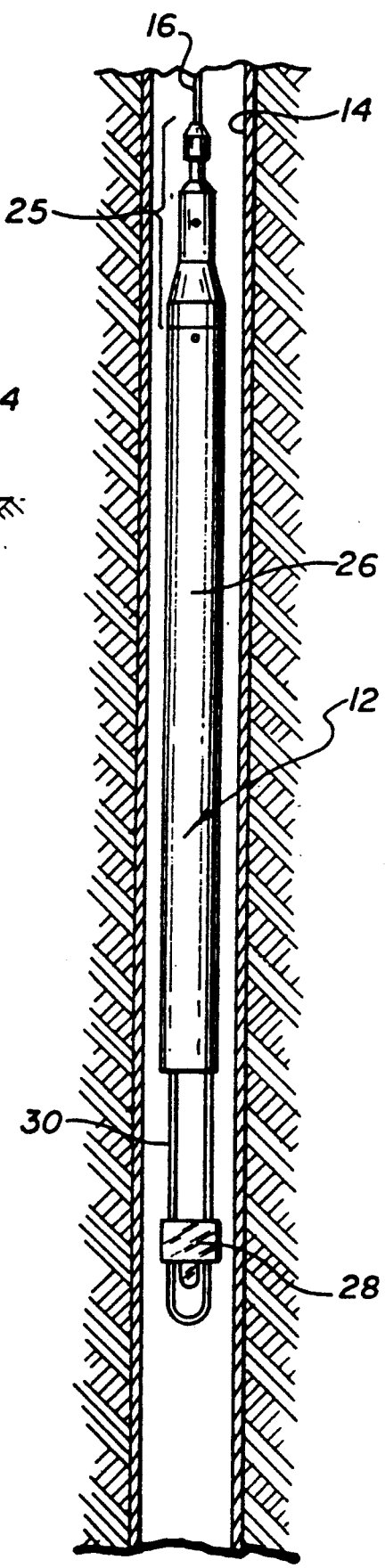
FIG. 2 is a side view of an instrument probe which is in place in a well bore showing a part of the support cable, cable head, camera section and the light section.

Referring now to FIG. 2, an instrument probe 12 is shown in greater detail and is presently disposed in a bore 14. The support cable 16 is connected to the probe 12. The probe 12 has three sections, a cable head 25, a camera head 26 and a light head 28. The light head 28 is attached to the camera head 26 through three legs 30, two of which are shown. Legs of different lengths may be used depending upon the inner diameter of the bore 14 or casing. The larger the inner diameter, the longer the legs should be so as to not interfere with the camera viewing angle.

Referring now to FIG. 3, the camera head 26 part of the instrument probe 12 is presented. Section 32 of the cable 16 is coupled to the optical transmitter section 34. At this component, electrical signals from the camera representing camera images are converted into optical signals and coupled to an optical fiber disposed within the cable. The optical fiber is used for the transmission of the images to the surface. Electrical/optical converters are well known in the art as well as couplers for coupling the converter 34 to the optical fiber and no further details are given herein.

The next section in the camera head 26 is the electrical section 36. The electrical power brought into the instrument probe 12 by the cable 16 is coupled to this section where the electrical power is converted into the voltages needed by the camera, the light and the electrical/optical converter. For example, the voltage supplied by the cable 16 may be 100 Vdc while the camera operates on 12 Vdc and the light on 50 Vdc. The electrical/optical converter may require 12 Vdc. Such converter boards are well known in the art, for example, Model SWA175-4300 by Power-One, Inc., Cammarillo, Calif.

The next section in the camera head 26 is the camera 38 itself. In one embodiment, the camera was a charge coupled device (CCD) type television camera which is capable of providing high speed, high resolution images in relatively dim light. One camera found to be usable in an embodiment is the CCD Video Camera Module having a model number of XC 37 made by Sony Corporation. Coupled to the camera is a lens 40 which in one embodiment was a fisheye lens, and a quartz window 42. The window 42 seals the camera head 26 at its bottom end and protects the lens 40 against high pressure/high temperature fluids which may exist in the well bore. Its angle is selected so as to not obstruct the viewing angle of the lens 40. Also shown in FIG. 3 is part of the legs 30 which are welded to the camera head 33 in this embodiment and which hold the light head 44 in position in front of the lens 40. The electrical conductors 48 are separately routed through the legs to the light head. In the embodiment shown, three legs were used although only two legs are shown in this figure.

Referring now to FIG. 4, the light head 28 is shown having a halogen lamp 46. The light head 28 is attached to the camera section by legs 30 which are also welded into the light head 28 in this embodiment. The length of the legs is selected based on the inner diameter of the bore or casing. Where the camera must see further because of a larger inner diameter of the casing, the legs 30 are made longer so that the light head will not obstruct the view of the lens. Where the inner diameter is small, the legs may be shorter so that more light is placed within the camera viewing angle. Thus, several different light heads with varying lengths of legs may be required. Electrical power conductors 48 which provide electrical power to the light traverse one or more of the legs 30. Other light sources may be used such as incandescent lamps. Additionally, light other than visible light may be used, for example, infrared and ultraviolet.

In accordance with the invention, power for the instrument probe 12 resides at the surface at the controller 22. In one embodiment, the power source at the controller 22 is transmitted to the support cable 16 via slip rings at the drum 20 in accordance with techniques known to those skilled in the art.

Figure 5:
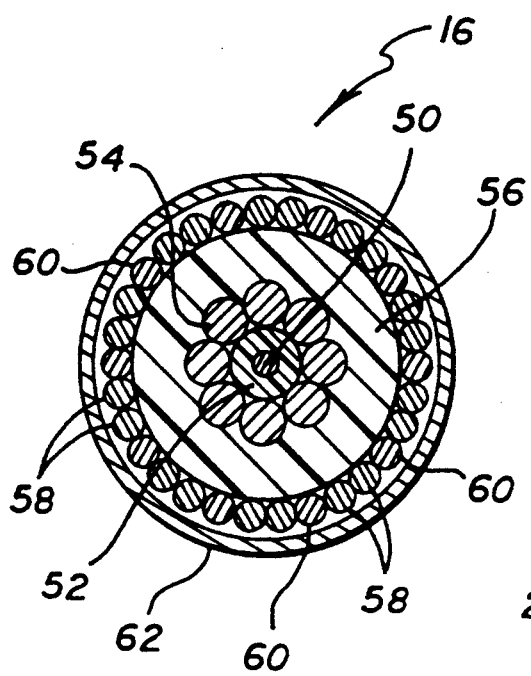
FIG. 5 is a cross-sectional view of a support cable in accordance with the principles of the invention.

In order to conduct the necessary power over the long distances commonly experienced by video logging systems, a multi-layer cable is provided. Referring now to FIG. 5, a cross-sectional view of a cable in accordance with the invention is presented. Disposed at the center is the optical fiber 50 and immediately around it is a buffer layer 52. Although only a single optical fiber is shown in this embodiment, multiple fibers may be used to comprise a fiber optic cable. The buffer layer 52 provides mechanical isolation. Surrounding the buffer layer 52 and coaxial therewith is an inner layer of electrically conductive strands 54 which in one embodiment are formed of copper. These strands form a power conductor which conducts power from the controller 22 to the instrument probe components. Surrounding the power conductor 54 is a layer of insulation 56 and surrounding the insulation is a layer comprising strength member strands 58 alternating with outer, electrically conductive strands 60. In this embodiment, one outer conductive strand 60 is interspaced with two strength member strands 58.

To balance the resistance of the power conductors 54 with the resistance of the strength members 58 which also serve as one leg of the resistive loop, ten outer electrically conductive strands which in one embodiment are formed of copper, are alternately interspaced in the total of thirty strands in the layer. The power conductor resistance when formed of copper strands is 6.1 ohms per 305 meters (1000 feet). The twenty steel and the ten copper resistive loop strands have a resistance of 18.1 ohms per 305 m (1000 ft). Thus, the loop resistance is 24.2 ohms per 305 m (1000 ft). Because of this arrangement of alternately interspaced copper and steel strands, the loop resistance is lowered. The diameter of the strength members then may be selected to satisfy only strength concerns rather than both strength and electrical conductivity concerns. It has been found that in a cable in accordance with the invention, the strength members are significantly smaller thus resulting in a much smaller and lighter support cable yet one with loop resistance low enough so that a manageable voltage may be used at the surface.

In one embodiment, the optical fiber used was a 50/125/245 multi-mode fiber with a buffer formed of Hytrel which is available from Dupont in Wilmington, Del. The optical fiber had a 0.050 mm core with 0.125 mm cladding. The Hytrel buffer was 0.18 mm (0.007 in.) in average thickness. The power conductors were 0.38 mm (0.015 in.) in diameter and were formed of copper HDBC, the insulator was 0.48 mm (0.019 in.) in thickness, and each strength member and resistive loop conductor was 0.25 mm (0.010 in.) in diameter. The insulation was compounded Hytrel and the strength strands were formed of improved plow steel.

Surrounding all of the above members is an outer sheath 62 which in one embodiment, is made of stainless steel sheet having a thickness of 0.20 mm (0.008 in.). In one embodiment, the stainless steel sheet was formed into a tube shape and welded lengthwise to form the outer sheath. The stainless steel is strong and fluid resistive thus protecting the internal components. It was found that forming the outer sheath of stainless steel provides a smooth outer surface thus facilitating its movement in pressure sealing glands and around sheaves and drums. Because it is relatively thin, it can be rolled on the sheaves and drums as necessary.

Because of the commonly-experienced high pressures of fluids found in bores, the cable entry point into the instrument probe 12 must be sufficiently sealed to protect against the entry of extraneous fluids. In accordance with the invention, a series of three fluid seals is provided. Each seal is formed of commonly available parts thus being economical to provide.

Figure 6:
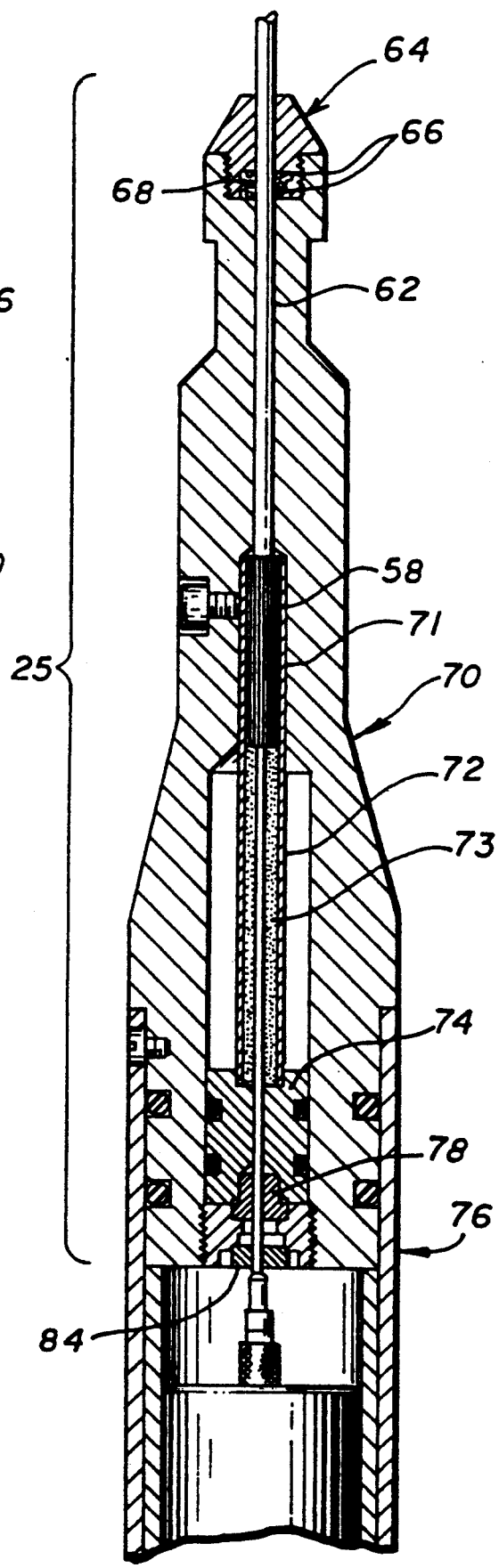
FIG. 6 is a partial cross-sectional view of the cable head showing the three seals of the support cable and the instrument probe in accordance with the invention.

Referring now to FIG. 6, mounted at the cable head 25 is the first seal 64. It comprises a compressive type seal using flexible materials such as ordinary "O-rings." In this embodiment, three O-rings are used and are compressed onto the outer cable sheath 62 as it enters the instrument probe. Two of these O-rings 66 comprise metal washers which have rubber seals inserted within them. These are commonly called Parker "Thread Seals" or "Stat-O-Seals" and are available from Parker Seals, Culver City, Calif. The third O-ring 68 is a conventional O-ring inserted between the two Parker thread seals.

Figure 7:
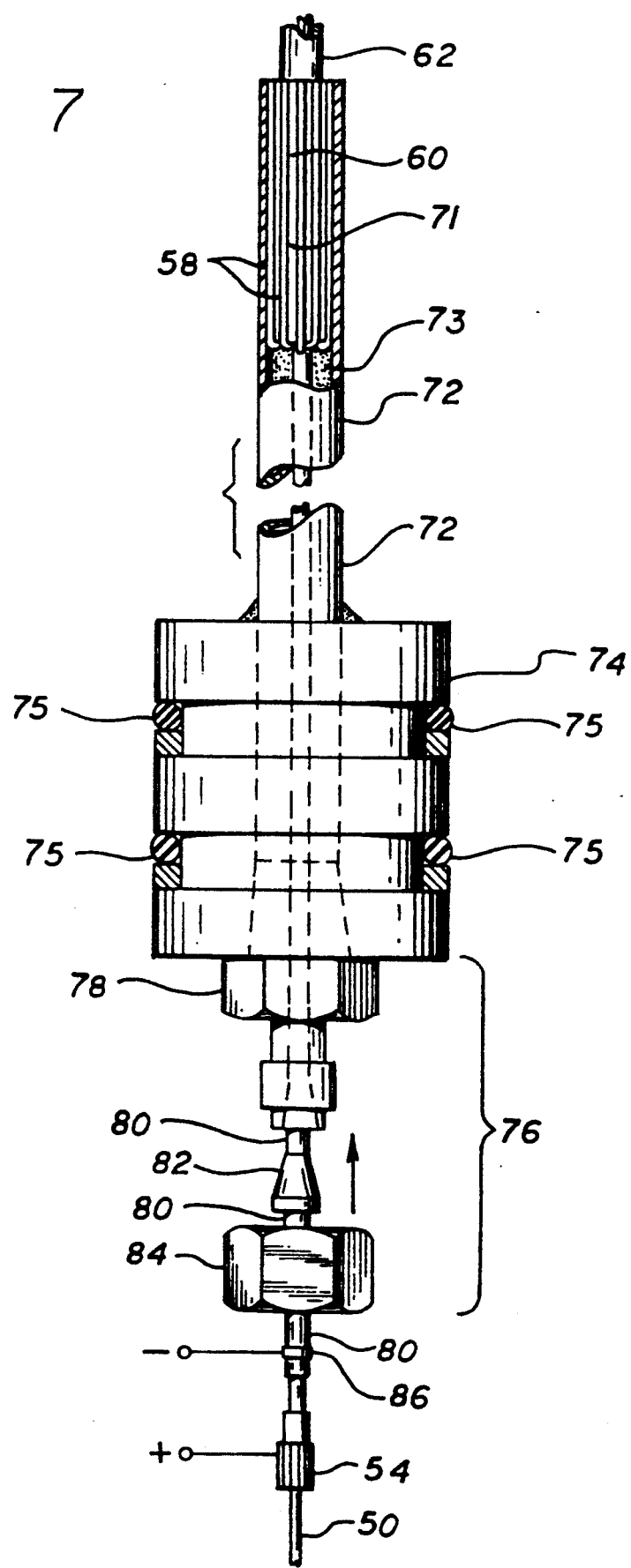
FIG. 7 is an exploded view of the third seal in accordance with the principles of the invention.

Referring now to FIGS. 6 and 7 for a description of the second seal, the outer sheath 62 is terminated and a length of tubing 71 is mounted on a selected length of the outer sheath 62 adjacent the termination point. The steel strength members 58 and outer conductors strands 60 are folded back over the tubing 71. The optical fiber, buffer, power conductor strands and insulation are not folded back. The folded back strands are then coated liberally with a fluid resistant adhesive caulking material 73 such as that sold as Tri-con #230 epoxy made by Tri-Con, Inc. of 55 North Street, Medford, Mass. After coating with epoxy, an outer bulkhead tube 72 is placed over the folded back strands. As is well known in the art, the number of strands folded back and their lengths determine the break-away force required for the cable to be separated from the instrument probe 12. By selecting the number and length of the bent back strength members, the force may be set so that if the instrument probe 12 should become stuck in a bore or casing for some reason, the cable may be pulled out of the instrument probe and then the instrument probe can be recovered by other means. In the event that a reduced break-away force is required, some of the strength members may be cut but not folded back.

The bulkhead tube 72 makes electrical contact with the bent back members thus putting the bulkhead tube 72 and bulkhead 74, to which the tube is joined, in the electrical return path. Additionally, in the embodiment shown, the length of cable covered by the bulkhead tubing 72 is also coated with the caulking 73 so that all parts of the cable covered by the bulkhead tubing 72 are coated. Upon setting, the adhesive caulking 73 will hold the support cable in position inside the bulkhead tubing as well as provide a fluid seal. In the event that greater electrical conductivity is required, an electrically conductive epoxy may be used.

Referring now more particularly to FIG. 7, welded to the other end of the bulkhead tube 72 is a bulkhead 74. As shown, it has fluid seals 75 on its outer surface. A threaded bore is formed through the bulkhead 74 for placement of the third seal 76. Mounted in the threaded bore and comprising part of the third seal is a compression coupler 78. The coupler 78 has NPT pipe threads formed on its end which is connected to the bulkhead thus forming a fluid seal. The other end of the coupler is shaped to accept a compression fitting and a compression nut for compressing the fitting. In the third seal, a compression sheath 80 also having a fluid resistant, adhesive caulking material placed inside is mounted over the remainder of the support cable which proceeds through the bulkhead. In one embodiment, a compression sheath 80 formed of brass tubing having a 3.2 mm (0.125 in.) outer diameter by 2.3 mm (0.090 in.) inner diameter. Placed over the compression sheath 80 is a compression fitting 82 and placed over the fitting 82 is a compression nut 84. As the compression nut 84 is turned onto the coupler 78, the compression fitting 82 is forced into closer contact with the compression sheath 80 thereby forming a fluid tight seal. The compression fitting 82, nut 84 and coupler 78 are all standard "plumbing" parts which are commonly available.

Thus by use of the three seals, the connection of the support cable with the instrument probe 12 is made fluid tight for use in high pressure environments. Additionally, because all of the seals are made of standard components, the three seals are economical to provide and manufacturing on a repeatable basis is facilitated.

Past the third seal, a contact 86 is formed on the compression sheath 80. Because the compression sheath 80 is in physical and electrical contact with other third seal parts which are in electrical contact with the bulkhead 74 which is in electrical contact with the bulkhead tube 72 which contacts the folded back steel strength members 58 and outer conductor strands 60, a potential is made available at the contact 86 as indicated by the terminal symbol. Past this contact, the power conductors 54 are folded back to make a second potential available. Past this point, the optical fiber 50 continues.

Thus, in accordance with the invention, a new and useful inspection system is provided having the power source for the instrument probe located at the surface rather than in the instrument probe itself. The design of the support cable results in lower loop resistance thus allowing a smaller cable and a more manageable supply voltage at the surface. Additionally, a smooth yet strong outer sheath on the cable makes it easier to handle yet it provides protection for the internal cable components. The fluid seals are relatively simple, easy to implement, lower in cost and can be manufactured on a repeatable basis.

It will be apparent from the foregoing that, while particular forms of the invention have been illustrated and described, various modifications can be made without departing from the spirit and scope of the invention.

Accordingly, it is not intended that the invention be limited, except as by the appended claims.

What is claimed is:

1. A communication and power cable comprising:
   an optical fiber;
   an inner layer of electrical conductors surrounding the optical fiber;
   an outer layer of electrical conductors surrounding the inner layer of electrical conductors;
   an insulator disposed between the inner layer of electrical conductors and the outer layer of electrical conductors, thereby separating said layers; and
   strength member strands disposed in one of said layers which are in electrical contact with the electrical conductors of said layer in which they are disposed, the strength member strands having a tensile strength substantially greater than the tensile strength of the electrical conductors of the layer in which they are disposed, but having an electrical conductivity substantially less than said electrical conductors.

2. The cable of claim 1 further comprising a continuous, metallic, tubular, sealed and smooth outer sheath which surrounds the optical fiber, inner, and the outer layers.

3. The cable of claim 2 wherein the outer sheath comprises steel.

4. A communication and power cable comprising:
   an optical fiber;
   an inner layer of electrical conductors surrounding the optical fiber;
   an outer layer of electrical conductors surrounding the inner layer of electrical conductors, the second layer being separated from the first layer;
   an insulator disposed between the first and second layers such that none of the electrical conductors of the first layer are in electrical contact with the electrical conductors of the second layer; and
   a plurality of strength members located in the second layer such that they are interspaced with and in electrical contact with the electrical conductors of the second layer, the strength member having a tensile strength substantially greater than the tensile strength of the outer layer electrical conductors, but having an electrical conductivity substantially less than the electrical conductors.

5. The cable of claim 4 wherein one strength member alternates with two electrical conductors in the outer layer.

6. The cable of claim 4 further comprising a continuous, metallic, tubular, sealed and smooth outer sheath which surrounds the optical fiber, the inner, and the outer layers.

7. The cable of claim 6 wherein the outer sheath comprises stainless steel.

8. A communication and power cable comprising:
   an optical fiber;
   an inner layer comprising a first plurality of electrical conductors surrounding the optical fiber;
   an outer layer comprising a plurality of electrically conductive strength members surrounding the inner layer and separated from said inner layer such that there is no electrical contact between the inner layer and the outer layer, and a plurality of electrical conductors interspaced with and in electrical contact with the strength members, the strength members having a tensile strength substantially greater than the tensile strength of the outer layer electrical conductors, but having an electrical conductivity substantially less than the electrical conductors, wherein the number of electrical conductors disposed in the outer layer is selected to achieve a predetermined resistance in the outer layer; and
   a continuous, sealed and smooth outer sheath which surrounds the optical fiber, the inner layer, and the outer layer.

9. The cable of claim 8 wherein one strength member alternates with two electrical conductors.

10. The cable of claim 8 wherein the outer sheath comprises stainless steel.

* * * * *